(12) United States Patent
Weber

(10) Patent No.: US 6,495,232 B2
(45) Date of Patent: Dec. 17, 2002

(54) COMPACT DISK WITH REMOVABLE CENTER PLUG

(76) Inventor: Warren D. Weber, 15718-53rd Pl. W., Edmonds, WA (US) 98026

( * ) Notice: Subject to any disclaimer, the term of this patent is extended or adjusted under 35 U.S.C. 154(b) by 0 days.

(21) Appl. No.: 09/564,454

(22) Filed: May 3, 2000

(65) Prior Publication Data

US 2002/0155245 A1 Oct. 24, 2002

(51) Int. Cl.[7] .............................. B32B 3/00; B32B 31/04; G11B 7/00
(52) U.S. Cl. ........................ 428/64.1; 428/43; 428/64.4; 428/65.2; 428/66.6; 428/66.7
(58) Field of Search ..................... 428/43, 40.1, 64.1, 428/64.4, 65.2, 64.7, 66.6, 66.7

(56) References Cited

U.S. PATENT DOCUMENTS 6,279,960 B1 * 8/2001 Claussnitzer ................. 283/81

FOREIGN PATENT DOCUMENTS

DE  29613123 U1 * 11/1996
DE  29615777 U1 *  3/1997

OTHER PUBLICATIONS

Foam disk CD business card holder adhered to letter advertisement for "nichecard.com" service dated Dec. 31, 1999 (see attached sketch).

* cited by examiner

Primary Examiner—Shrive P. Beck
Assistant Examiner—Elena Tsoy
(74) Attorney, Agent, or Firm—Dean A. Craine

(57) ABSTRACT

A compact digital disk assembly having a label which extends over substantially all of the upper surface of the disk, thereby facilitating the display of artistic and textual information uninterrupted by a center cutout normally found on compact disks. The assembly includes a conventional compact disk having a center cutout, a CD plug insertable in the cutout, and a label having a removable portion extending over the cutout. The label is affixed to the upper surfaces of the CD and the CD plug with a pressure sensitive adhesive.

6 Claims, 3 Drawing Sheets

COMPACT DISK WITH REMOVABLE CENTER PLUG

BACKGROUND OF THE INVENTION

1. Field of the Invention

This invention generally relates to compact digital disks, and more particularly, to a compact disk (CD) having a removable center plug and a label extending over the central portion of the CD thereby facilitating the display of artistic and textual information on the label uninterrupted by a conventional center cutout.

2. Description of the Related Art

It has been common practice for many decades for record producers to include various types of printed matter with sound recordings intended for retail sale. When vinyl records were the medium of choice for sound recordings, the album covers or jackets in which the records were packaged provided ample space on which to print photographs, artistic works, and textual materials. It was also relatively easy with such albums to include multi-page booklets within the albums. As sound recording technology evolved, the recording medium became much more compact, thus eliminating much of the space for printed matter which had been available with the earlier technology. As a result, it became increasingly important to maximize use of the available space on the medium itself and its associated packaging.

At present the most popular medium for sound recording is the digital compact disk (CD). A CD is most typically constructed from a thin, cylindrically shaped disk formed from polycarbonate. A cylindrical cutout is formed in the disk to facilitate handling of the disk during the manufacturing and duplication process. The cutout also permits it to be secured on a standardized hub formed in the plastic base of many CD containers to minimize the possibility of damage to the CD during shipping. Frequently, a circular label slightly smaller in diameter than the outer diameter of the CD containing preprinted textual and/or graphical matter is applied by means of a pressure sensitive adhesive to the upper surface of the CD. In order that the label does not extend over the center cutout in the CD, a concentric cutout having a diameter somewhat greater than that of the CD cutout is made in the label. The label is normally made of paper or a plastic film, but other materials may be used.

The presence of the center cutout in the label creates a significant problem in label design and layout. First, the cutout eliminates valuable space from the label surface on which space is already at a premium. Secondly, it requires that all artistic and graphical works incorporate the cutout in a visually pleasing manner and that textual material be arranged around the cutout.

Numerous modifications to CD construction which would permit the elimination of the center cutout in the label have been proposed in the past. For example, it has been suggested that the CD could be manufactured as a one-piece unit including a filler plug disposed within the CD cutout and connected to the walls of the cutout by a plurality of small plastic ties. The CD and the plug would form a substantially continuous surface to which a label not having a center cutout could be applied. The label would remain intact until the center plug was removed by the first user of the CD. The principal difficulty with this solution was that the equipment used to manufacture the CD was dependent upon the presence of the center cutout in the CD blank. Attempts were also made to manufacture a Center plug which engaged the center cutout of the CD with an interference fit and could be forced into place after manufacture of the CD to provide support for the center portion of a continuous label. Unfortunately, the stresses imposed on the CD by the plug ultimately resulted in cracking of the CD. In order to avoid the high stresses on the CD resulting from an interference fit between the plug and the CD, attempts were made to construct a plug having spring-like protrusions formed in its periphery for retaining it within the cutout. However, such designs proved to be-too costly and impractical.

Accordingly, it is an object of this invention to provide for a CD assembly which includes a label extending over substantially all of the upper surface of the CD so as to provide a substantially uninterrupted area for the presentation of artistic, graphical and textual information.

It is a further object of this invention to provide 15 for a CD assembly having a removable center plug which permits the CD to be manufactured and duplicated with conventional manufacturing equipment which requires a cutout at the center of the CD.

It is a further object of this invention to provide for a CD assembly having a center plug which is removably retained within the center cutout by a label adhesively attached to the CD.

It is yet another object of this invention to provide for a CD assembly having a label with a removable center 25 portion and a center plug adhesively attachable to that center portion such that when removed from the cutout the plug may be repositioned and retained within the cutout substantially in its original position.

SUMMARY OF THE INVENTION

It is an object of the present invention to provide for a CD assembly including a label extending uninterrupted over substantially all of the upper surface of the CD. The CD assembly includes a compact disk having a cutout, a plug removably insertable in the cutout and a label attachable to the upper surfaces of the compact disk and extending over the cutout for removably securing the plug within the cutout.

In accordance with a more detailed aspect of this invention, the label includes a removable portion extending over the cutout and attachable to the upper surface of the plug. According to yet more detailed aspects of the invention, the removable portion is defined by an array of perforations which extend radially beyond the cutout when the label is attached to the compact disk.

According to other more detailed aspects of the invention, the plug is cylindrical in shape and has a thickness greater than the thickness of the CD. Other embodiments of the invention include a plug which is frusto-conical in shape and a plug which includes a plurality of radially extending tongs.

DESCRIPTION OF THE PREFERRED EMBODIMENT(S)

Figure 1:
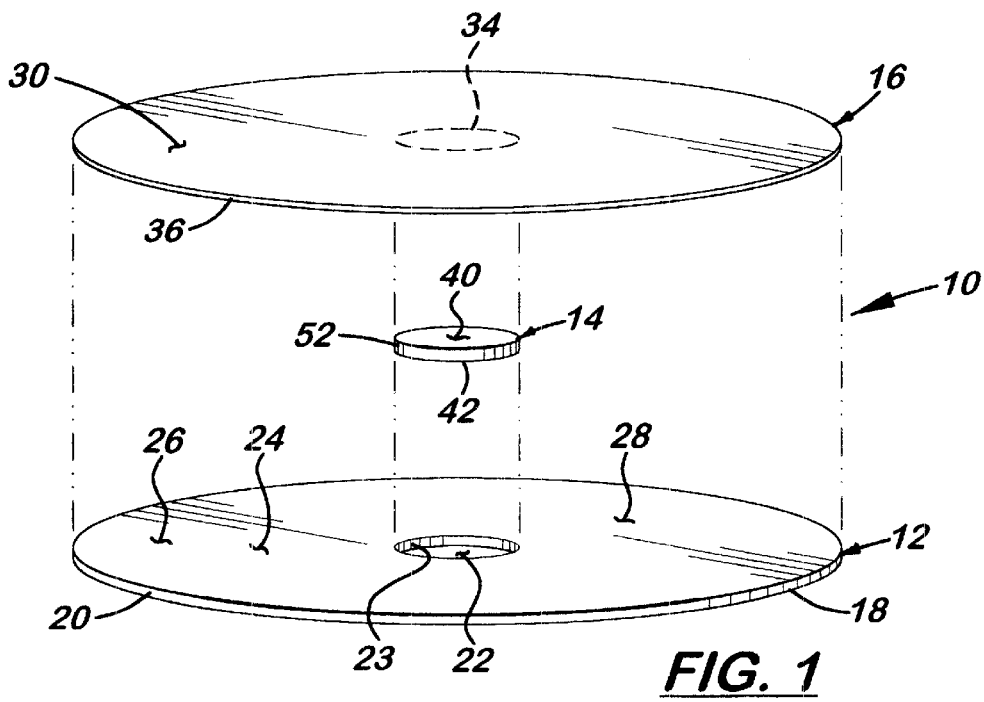
FIG. 1 is a front perspective view of a compact disk assembly constructed in accordance with the present invention.
Figure 2:
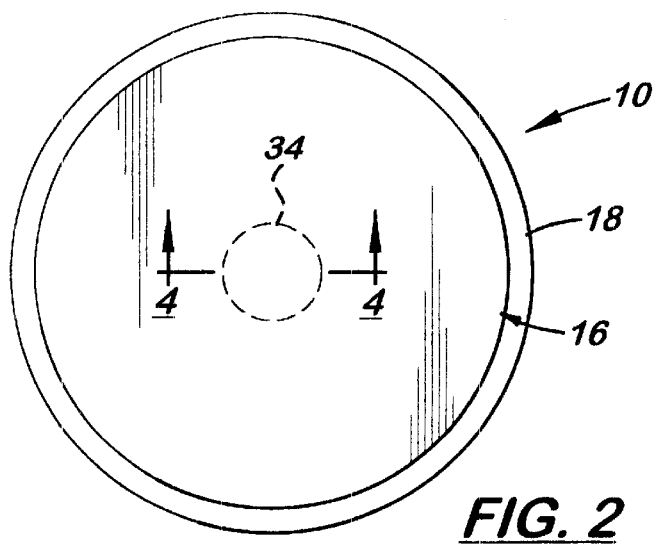
FIG. 2 is a top plan view of the compact disk assembly of FIG. 1.

The novel features believed to be characteristic of this invention are set forth in the appended claims. The invention itself, however, may be best understood and its various objects and advantages best appreciated by reference to the detailed description below in connection with the accompanying drawings.

In FIGS. 1 through 7 of the drawings, a compact disk assembly constructed in accordance with the teachings of the present invention is illustrated and generally designated by the number 10. The assembly includes compact disk 12, CD plug 14, and label 16. The compact disk 12 itself is of conventional construction having a preferably cylindrical base 18 formed of polycarbonate or another acceptable plastic. The base 18 has a uniform thickness "t", an outer peripheral surface 20, and a centrally located cylindrical cutout 22 bounded by peripheral surface 23. A recording medium in the form of a thin, silver oxide coating 24 is uniformly applied to upper surface 26 of the base 18. A clear resin ultraviolet protective coating 28 is applied directly over the recording medium.

CD plug 14 is preferably cylindrical in shape and has a thickness 'T' slightly greater than the thickness of the compact disk 12 for reasons to be discussed in greater detail below. The CD plug 14 is slightly smaller in diameter than cutout 22 so as to provide a loose fit or at most a slip fit when inserted in the cutout 22. Also it is preferably formed of polycarbonate, which may be optically clear, translucent or opaque, but other suitable plastics or other materials may be substituted.

The label 16, which may be formed of plastic film or paper with or without an overlaying laminate film, is preferably circular with a diameter somewhat less than that of base 18. Typically the label 16 would be preprinted on its upper surface 30 with artistic, graphical and/or textual material. The label 16 includes a removable portion 32 which is centrally located on the label 16 and bounded by a circular array 34 of perforations. The array 34 has a diameter "d' which exceeds the diameter of the CD plug 14 by a predetermined amount "x'. A pressure sensitive adhesive 36 is applied to the entire undersurface of the label 16 to facilitate attachment of the label 16 to upper surface 26 of the base 18 and upper surface 40 of the CD plug 14.

Figure 4:
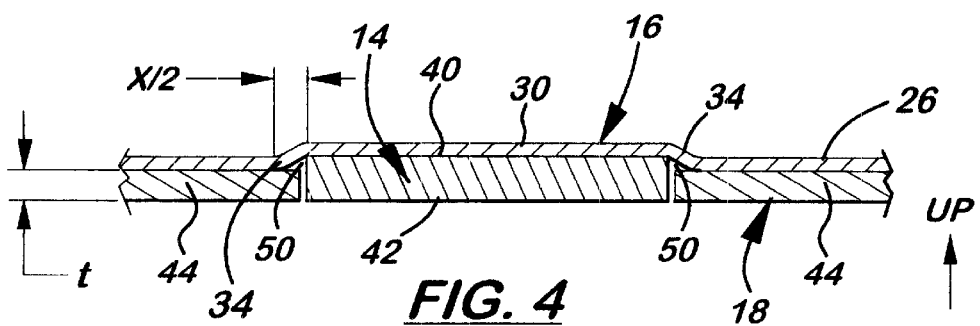
FIG. 4 is a partial sectional view taken at 4–4 FIG. 2.
Figure 3:
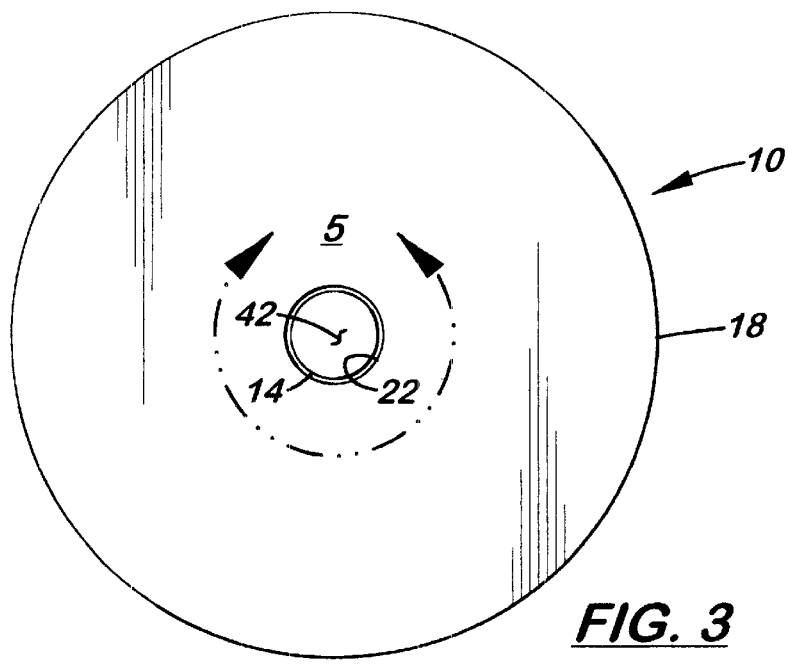
FIG. 3 is a bottom view of the same assembly.
Figure 5:
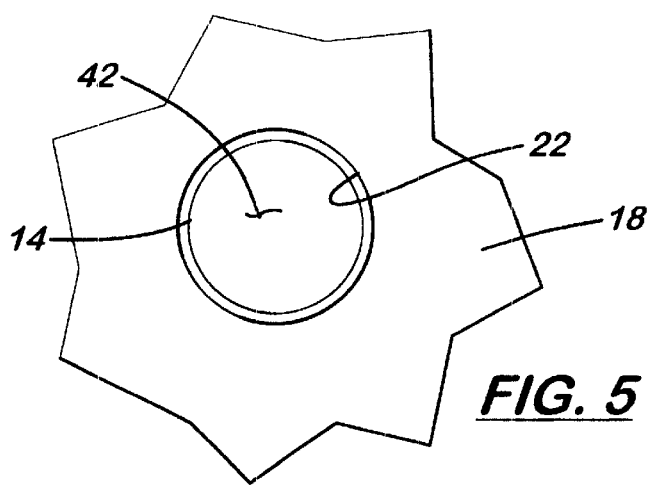
FIG. 5 is a partial, enlarged view of the central portion of the assembly of FIG. 3.
Figure 6:
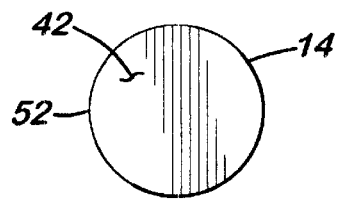
FIG. 6 is a top plan view of the preferred embodiment of the CD plug of FIG. 1.
Figure 7:
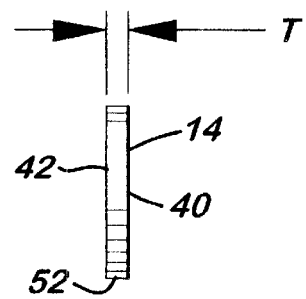
FIG. 7 is a side elevational view of the plug of FIG. 6.

In the manufacture of compact disk assembly 10, CD plug 14 is inserted either manually or by machine into -cutout 22 of base 18 such that lower surface 42 of the plug 14 is substantially flush or coplanar with lower surface '44 of the base 18. As shown in FIG. 4 it can be seen that when the base 18 and the CD plug 14 are so positioned, upper surface 40 of the plug 14 extends a distance of (T-t) above upper surface 26 from the base 18. Next, the label 16 is concentrically positioned over compact disk 12 and CD plug 14 and adhered in that position to CD coating 28 and upper surface 40 of the plug 14 by adhesive 36. Because the surface 40 extends slightly above upper surface 26, a small air Space 50 bounded by upper surface 26 of the base 18 under adhesive surface 36 of the label 16 and peripheral surface 52 of the plug 14 is formed. The purpose of the air space 50 is to assist the user in removing and attaching the CD plug 14 from the CD assembly 10, as discussed below. It can be seen that the CD plug 14 is now retained within cutout 22 by its adhesive attachment to the label 16.

The compact disk assembly 10 is packaged for sale in the assembled position as described above in a CD container not having a hub. In such a container the CD is retained merely by frictional engagement of outer periphery 20 of the disk 14 to mating portions of the container. Most modern CD players do not require that CDs be mounted on a hub when being loaded into the machine, so most users will have no need to remove the CD plug 14 in order to play the CD. Thus they can continue to view and enjoy the material printed on the label 16 which is uninterrupted by the usual center cutout 22 in the label 16.

Should it become necessary for the' user to remove the CD plug 14, he or she may simply do so by holding the outer periphery 20 of the CD 12 with the fingers of one hand, grasping the CD plug 14 between the thumb and forefinger of the other hand and applying a slight' pressure in an upward direction. Such pressure will cause the label material between he perforations to part along the locus of the array 34 and release the plug 14 from the CD assembly 10. The release is facilitated by air space 50 because the label 16 is not adhered to upper surface 26 in the narrow annular area adjoining cutout 22. After the disk 12 is used, the compact disk assembly 10 may be reassembled by simply inserting the CD plug 14 back into cutout 22 and pressing overhanging portion 54 of the label 16 into contact with the annular area so as to secure the CD plug 14 in position. The continuity of the printed material in the label 16 may be reestablished by simply aligning or registering the printed materials on removable portion 32 of the label 16 with other material on the remainder of the label 16. The CD plug 14 can be removed and replaced repeatedly in the CD 12 for so long as the adhesive continues to function.

An apparent advantage of this invention is that it permits the user to maintain the CD assembly 10 in its original condition with an unbroken label 16, thus enhancing its value if the CD 12 is regarded as a collector's item.

Another advantage of this invention is that it provides for a means for verifying that the CD 12 is in unused condition if such use would necessitate removal of the CD plug 14. Such use would be obvious from a cursory examination of the perforated area 34 of the label 16. Detection of use could not be avoided by removal of the entire label 16 from the assembly because due to the aggressiveness of the adhesive, such removal would simultaneous removal of portions of the underlying recording medium.

Figure 8:
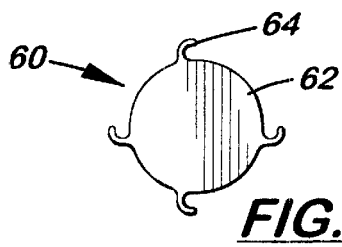
FIGS. 8 and 9 are top and side elevational views, respectively, of an alternate embodiment of the CD plug.
Figure 9:
Figure 10:
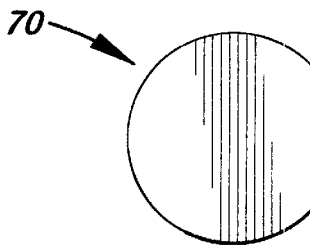
FIGS. 10 and 11 are top and side elevational views, respectively, of a second alternate embodiment of the plug.
Figure 11:
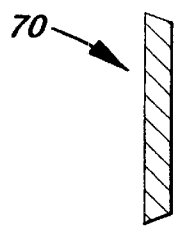
Figure 11:
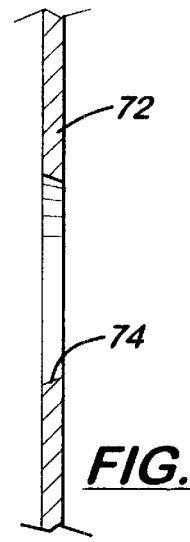
Figure 12:
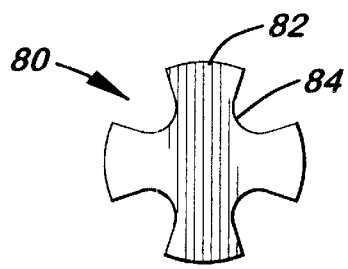
FIGS. 12 and 13 are top and side elevational views, respectively, of a third alternate embodiment of the plug.
Figure 13:
Figure 14:
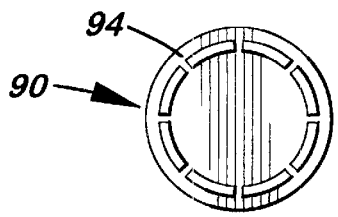
FIGS. 14 and 15 are bottom and side elevational views, respectively, of a fourth alternative embodiment of the plug.
Figure 15:
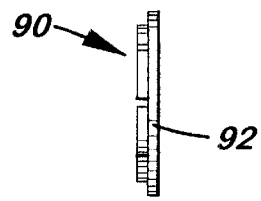

FIGS. 8 through 15 illustrate four alternate embodiments of the CD plug. FIGS. 8 and 9 show plug 50 having a plurality of arcuate peripheral portions such as portion 62 and a plurality of flexible tongs such as tong 64 spaced around that periphery. The purpose of the tongs is to engage inner periphery 0.23 of CD 12 and thereby assist in retaining the plug within cutout 22. FIGS. 10 and 11 illustrate a plug 70 which is frusto-conical in shape. In this embodiment base 72 includes mating frusto-conical cutout 74. FIGS. 12 and 13 show CD plug 80 which includes a plurality of arcuate peripheral portions, such as portion 82, which are spaced by a plurality of cutouts such as cutout 84. Finally, FIGS. 14 and 15—illustrate alternate plug embodiment 90 which includes a thin, cylindrical cap portion 92 and a plurality of spaced wall-like projections, such as projection 94, extending downward from the bottom of cap 92. When inserted in cutout 22 of the base, cap 92 would rest on upper surface 26 and the wall like projections would extend down into the cutout so as to center the plug in position.

Thus, it can be seen that the present invention provides for an improved compact disk assembly 10 which incorporates many novel features and offers significant advantages over the prior art. Although only five embodiments of this invention have been illustrated and described, it is to be understood that obvious modifications could be made of it without departing from the true scope and spirit of the invention.

In compliance with the statute, the invention described herein has been described in language more or less specific as to structural features. It should be understood, however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A compact disk assembly comprising:
   a. a compact disk including a center cutout and a first upper surface;
   b. a removable CD plug inserted into said center cutout and having a second upper surface;
   c. a label attached over said first and second upper surfaces, said label including a center circular array of perforation lines aligned and registered over said CD plug thereby enabling said CD plug to be repeatedly removed and inserted into said compact disk; and,
   d. means to temporarily hold said CD plug inside said center cutout in said compact disk.

2. The assembly of claim 1 wherein said array has a diameter greater than the diameter of said cutout on said compact disk.

3. The assembly of claim 1 wherein said plug and said cutout are cylindrical in shape.

4. The assembly of claim 1 wherein said means to temporarily hold said plug in said cutout on said compact disk includes said plug and said cutout being frustoconical in shape to enable said plug to be forcibly received by said cutout.

5. The assembly of claim 3 wherein said means to temporarily hold said plug in said cutout is a plurality of tongs on said plug slidably engagable with said cutout.

6. A compact disk assembly comprising:
   a. a compact disk including a cylindrical, center cutout having a preselected diameter, a thickness of "t" and a first upper surface;
   b. a cylindrical CD plug having a thickness "T" greater than "t" and a second upper surface, the CD plug being inserted in the cutout; and,
   c. a label attached to the first and second upper surfaces, the label including a removable portion extending over the cutout and being defined by a circular array of perforations having the diameter greater than the preselected diameter of the cutout.

* * * * *